A. FISHER.
SAWING MACHINE.
APPLICATION FILED OCT. 29, 1908.
939,488.
Patented Nov. 9, 1909.
2 SHEETS—SHEET 1.
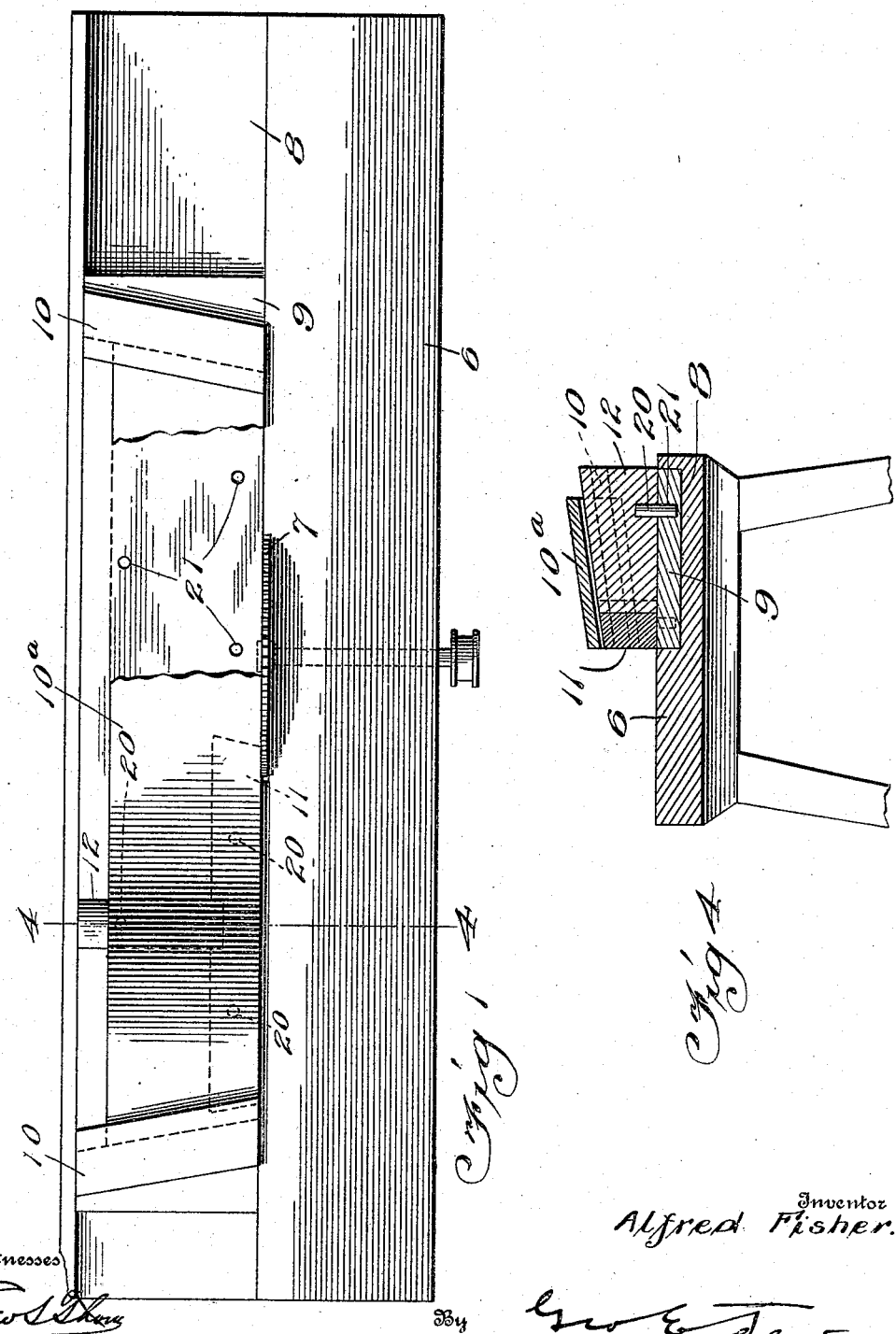
Witnesses
Inventor
Alfred Fisher.
By
Attorney

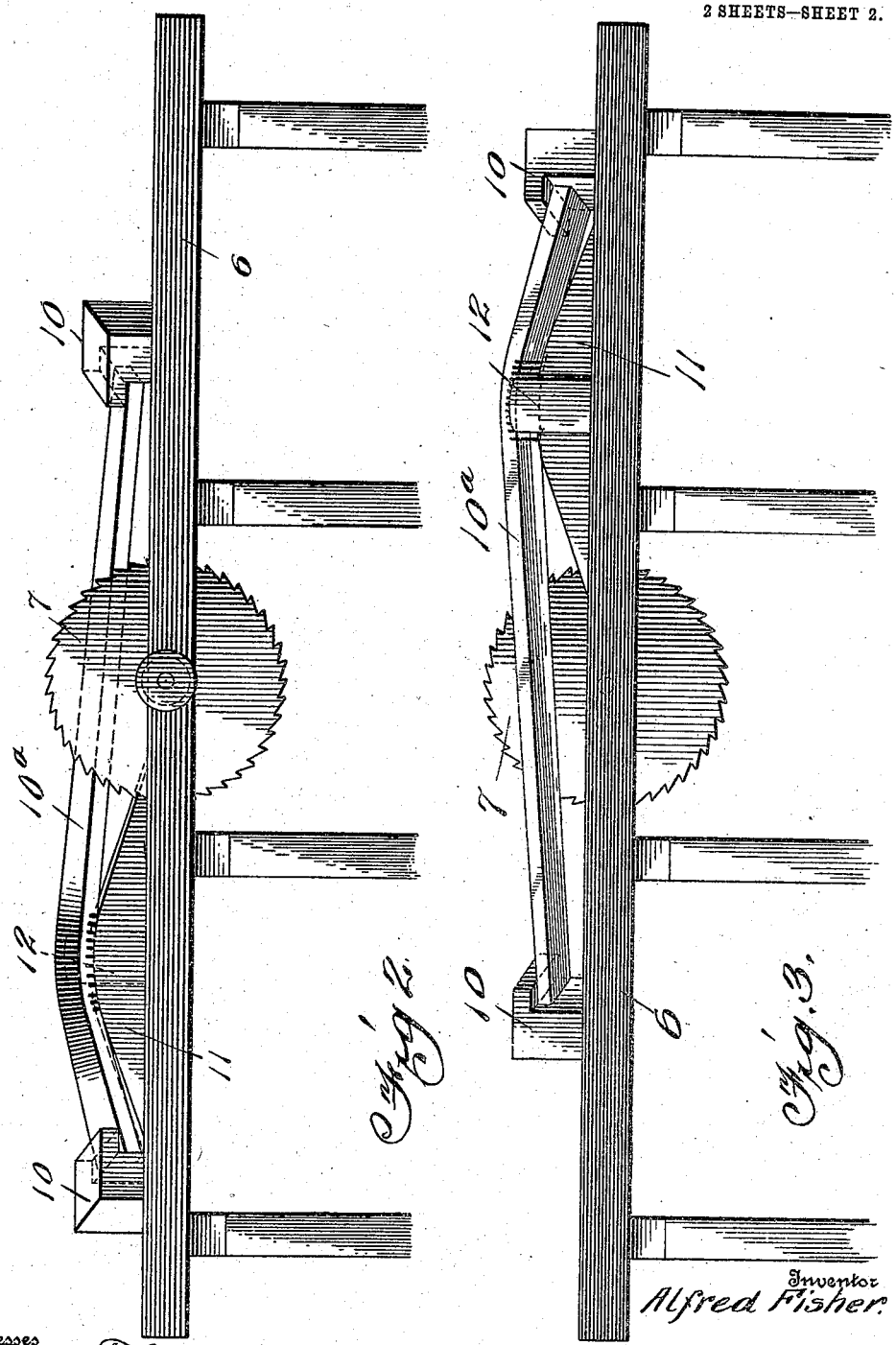

UNITED STATES PATENT OFFICE.

ALFRED FISHER, OF JACKSON, MISSISSIPPI.

SAWING-MACHINE.

939,488. Specification of Letters Patent. Patented Nov. 9, 1909.

Application filed October 29, 1908. Serial No. 460,040.

*To all whom it may concern:*

Be it known that I, ALFRED FISHER, a citizen of the United States, residing at Jackson, in the county of Hinds and State of Mississippi, have invented certain new and useful Improvements in Sawing-Machines, of which the following is a specification.

This invention is a device for use in connection with a sawing machine, and is intended particularly for ripping the bottom or lower edge of the side of what is known as a sawed side coffin.

It includes a form which holds the work on a rip-saw bench, and which is movable to carry the work to the saw.

Although intended for use particularly in connection with sawing coffin sides, the invention is capable of application wherever it may be desired to saw an edge on bent work, particularly where said edge is cut on a bevel with respect to the plane of the work.

A coffin side is bent, as a rule, and also stands at an inclination from the vertical, and in order to match the same with the bottom the lower edge is at an angle somewhat obtuse with respect to the plane of the side. In consequence of the curvature of the side this angle varies slightly, and in order to be exact the side should be sawed or ripped with the same in the relative position or curvature which it will have when the coffin is assembled.

The object of this invention is to provide a machine which will do this work in a correct and efficient manner, and it therefore comprises a form over which the coffin side is bent and held while it is being sawed.

The invention is illustrated in the accompanying drawings in which—

Figure 1 is a plan view of a rip-saw bench provided with the improvement. Fig. 2 is a side elevation of one side. Fig. 3 is a similar elevation of the other side. Fig. 4 is a section on the line 4—4 of Fig. 1.

Referring specifically to the drawings, 6 indicates the saw-bench and 7 the rip-saw. The bench has a slide way 8 for the carriage or slide 9 which holds the work. This carriage has on the top thereof a pair of clamps 10, at opposite ends, said clamps consisting of cross pieces with over-hanging shoulders at the top, the cross pieces being inclined, at least in coffin work, to agree with the bevel or angle at the end of the coffin side which is indicated at 10, the purpose being to hold the work in proper position with respect to the saw.

Mounted upon the carriage, between the clamps, is a form consisting in the embodiment shown of a longitudinal piece 11 and and a cross piece 12. The top edges or surfaces of these pieces are inclined or shaped to an angle or form corresponding to the shape of the work, or which the work will assume when finished. For a coffin side, the board will be bent over the form, its ends being caught in the clamps 10, and the board will thus have the proper shape. The edge of the board will thus be held at a proper angle with respect to the saw, to saw the edge with the desired bevel. After the work is placed on the form the carriage or slide is advanced to the saw in the usual manner, and the board is ripped with the proper curve for the intended purpose. Any kind of bent work may be edged in similar manner, and the machine will save considerable hand trimming and irregular work.

The scope of the invention is not limited to the particular embodiment shown. The form over which the work is bent may be varied as desired. Also other clamps may be used, or a different kind of a saw, modifications in these and other particulars being within the scope of the invention.

The form shown is removable and another form may be substituted. To this end, the form is provided on the under side with dowels 20 which fit in holes 21 in the carriage. Also, the form may be shifted from one end of the carriage to the other. It is shown at one end of the carriage, but holes 21 are also shown at the other end, and the form can be detached or lifted off from the position shown and moved to the other end. This allows either right or left edge work to be done, as in shaping up opposite sides of a coffin.

I claim:

The combination with a saw, of a reciprocating work holder movable beside the saw and having clamps at opposite ends comprising converging blocks between which the work is placed, the blocks having over-hanging shoulders inclined downwardly toward one end, to engage over the ends of the work, and a form between the clamps, at the edge of the carriage adjacent to the saw, the form being inclined laterally with respect to the plane of the saw and downwardly in the same direction as the shoulders.

In testimony whereof, I affix my signature in presence of two witnesses.

ALFRED FISHER.

Witnesses:
T. MINTNER,
M. P. SAUNDERS.